United States Patent
Nagata et al.

(10) Patent No.: US 7,348,978 B2
(45) Date of Patent: Mar. 25, 2008

(54) IMAGE PROCESSING

(75) Inventors: Takahiro Nagata, Tokyo (JP); Makoto Takanashi, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 30 days.

(21) Appl. No.: 11/147,387

(22) Filed: Jun. 8, 2005

(65) Prior Publication Data

US 2005/0280645 A1    Dec. 22, 2005

(30) Foreign Application Priority Data

Jun. 22, 2004    (JP) .............................. 2004-184233

(51) Int. Cl.
G06T 15/00    (2006.01)
(52) U.S. Cl. .................. 345/427; 345/419; 345/619; 463/30
(58) Field of Classification Search ................ 345/419, 345/418, 427; 463/30–33; 346/619–623
See application file for complete search history.

(56) References Cited

U.S. PATENT DOCUMENTS

| | | | |
|---|---|---|---|
| 5,581,796 A | 12/1996 | Koga et al. ................. | 395/133 |
| 6,012,014 A | 1/2000 | Koyanagi et al. ........... | 701/208 |
| 6,890,261 B2 * | 5/2005 | Nagase ........................ | 463/31 |
| 7,118,480 B2 | 10/2006 | Aoki ........................... | 345/419 |

FOREIGN PATENT DOCUMENTS

| | | |
|---|---|---|
| JP | 2955989 | 7/1999 |
| JP | 2002-063591 | 2/2002 |

OTHER PUBLICATIONS

Notification of First Office Action issued by the Chinese Patent Office on Aug. 11, 2006, in Chinese Patent Application No. 200510079517.5 and English-language translation thereof, pp. 1-16.
European Search Report dated Nov. 3, 2005 for European Application No. 05253866.7, pp. 1-3.

* cited by examiner

*Primary Examiner*—Phu K Nguyen
(74) *Attorney, Agent, or Firm*—Finnegan, Henderson, Farabow, Garrett & Dunner, L.L.P.

(57) ABSTRACT

Provided is image processing technology capable of displaying lines on a field clearly on a screen regardless of the distance to the viewpoint or the visual direction. This image processing method has a step for disposing a linear model formed from multiple polygons in a coordinate system of a three dimensional space based on an image processing program stored in a memory, a step for setting a viewpoint in the coordinate system, a step for performing perspective transformation to the model viewed from the viewpoint, and a step for drawing a linear texture having a prescribed dot width in a frame buffer at a coordinate position after the perspective transformation of the model. The linear texture is drawn on the model in a width of minimum dots regardless of the width occupying the coordinates after the perspective transformation of the model.

6 Claims, 6 Drawing Sheets

▲ : PIXEL NOT OVERLAPPNG WITH OTHER TRIANGLES
■ : PIXEL OVERLAPPNG WITH OTHER TRIANGLES

IMAGE PROCESSING

BACKGROUND OF THE INVENTION

1. Field of the Invention

The present invention generally relates to image processing technology, and particularly relates to an image processing method to be employed in game applications of domestic game devices and computer games.

2. Description of the Related Art

As an application program of conventional domestic game devices, there is a soccer game. In this soccer game, the field line (white line) is configured from a plurality of polygons to which a white line texture has been affixed thereto. In this program, a viewpoint is defined in a global coordinate system, and the screen image of the line in the field of this coordinate system viewed from the viewpoint is subject to perspective transformation and drawn in the frame buffer. When the viewpoint is distant from the line and the angle of the viewpoint viewing the line is small in relation to the line, the line would become a one dot width or less due to the resolution of the display device in the game device, and there were inconveniences in that the line would become broken or displayed as dots on the screen.

In order to overcome this kind of problem, as disclosed in Japanese Patent No. 2955989, polygons of the line placed on the field are inclined to increase the area when viewed from the viewpoint.

Figure 8:
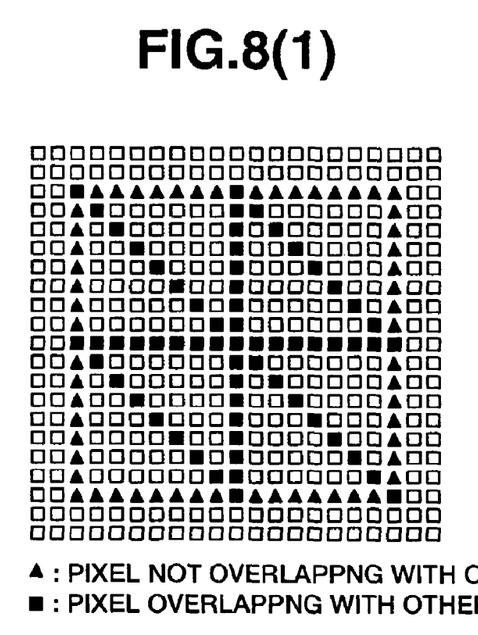
FIG. 8 is a principle diagram showing an example of the drawing operation of the model of the line.

Further, FIG. 8 is a diagram explaining why a linear object cannot be displayed accurately. Let it be assumed that eight triangular polygons are to be displayed closely as shown in FIG. 8(2). Each of the symbols □■▲ illustrated in FIG. 8(1) represents one pixel on the screen. Since each of the triangles (1-8 in FIG. 8(2)) is disposed closely, the pixels of ■ will overlap with the adjacent triangles. Whether to display the pixels of ■ according to a certain algorithm is determined in order to avoid such overlap. As a result, there are cases where the edges of polygons are not represented properly. The ratio of pixels representing edges will increase pursuant to the decrease in the area of polygons, and the accuracy of the polygons will thereby deteriorate. Thus, elongated polygons are sometimes displayed as dots or not displayed at all.

SUMMARY OF THE INVENTION

An object of the present invention is to provide image processing technology capable of displaying lines on a field clearly on a screen regardless of the distance to the viewpoint or the visual direction.

In order to achieve the foregoing object, the present invention is an image processing method with an image processing device having an image processing arithmetic unit, the image processing arithmetic unit including: a step for disposing a linear or curvilinear model formed from polygons in a coordinate system of a three dimensional virtual space based on an image processing program stored in a memory; a step for setting a viewpoint in the coordinate system; a step for performing perspective transformation to the model viewed from the viewpoint; and a step for drawing a line having a fixed width in a drawing memory based on the coordinate position after the perspective transformation of the model; wherein the line is drawn on the coordinate position after the perspective transformation of the model in a fixed width regardless of the occupancy of the width in the coordinate after the perspective transformation of the model.

According to the present invention, even if the width of the linear model (object) after perspective transformation is less than the value to be displayed on the display device, for instance, or, as shown in FIG. 8, if the width is not displayed due to the algorithm, since a separate line having a fixed width is displayed at the position of the line object, there is an advantage in that a player will always be able to recognize the field line; for example, the boundary (line) of the play field in ball sport games such as a soccer game regardless of the position of the virtual viewpoint. The width of the separate line to be drawn will suffice so as long is it is one pixel (one dot) worth when the width of the line object after perspective transformation is a value less than the displayable value.

The separate line having a one dot width connects a plurality of pixels on the display in a line shape (straight line, curved line, circular line, etc.) and, preferably, is displayed as a line to which a linear texture having a one dot width is applied thereto. Data corresponding to this texture is set in the area of a prescribed pixel of the frame buffer. A white line is preferably used as the texture.

The present invention is also a program for making a computer execute each of the foregoing steps, as well as a recording medium having such program recorded thereon.

Further, the present invention is an image processing device having a memory storing an image processing program, and an arithmetic unit for executing image processing based on the program, the arithmetic unit including: a unit for disposing a linear or curvilinear model formed from polygons in a coordinate system of a three dimensional virtual space based on an image processing program stored in a memory; a unit for setting a viewpoint in the coordinate system; a unit for performing perspective transformation to the model viewed from the viewpoint; and a unit for drawing a line having a fixed width in a drawing memory based on the coordinate position after the perspective transformation of the model; wherein the line is drawn on the coordinate position after the perspective transformation of the model in a fixed width regardless of the occupancy of the width in the coordinate after the perspective transformation of the model.

Moreover, the present invention is an image processing program in an image processing device configured to read object data from a storage unit and disposing it in a three dimensional virtual space, and output a two dimensional projected image viewing the object from a prescribed viewpoint, wherein the object is a line object formed from polygons and constituting a straight line, segment or curved line having a prescribed width in the three dimensional virtual space; the storage unit stores starting point position coordinate data and ending point position coordinate data further set in correspondence with the position coordinate of the line object in the virtual space; and the image processing program includes: a step for disposing the line object in the three dimensional space; a step for performing two dimensional perspective transformation to the line object and the starting point position coordinate and ending point position coordinate from the viewpoint position; and a step for drawing a segment connecting the starting point position coordinate and ending point position coordinate subject to the two dimensional perspective transformation superimposed on the two dimensional perspective transformation image of the line object.

According to the present invention, since a straight line having a prescribed width connecting the position coordinates of both ends of the line object can be drawn in the frame buffer by superimposing it on the two dimensional perspective transformation image of the line object, for example, even if the line object after perspective transformation becomes one pixel or less, the image of the line object will constantly be displayed on the display unit.

In addition, the present invention is an image processing program in an image processing device configured to read object data from a storage unit and disposing it in a three dimensional virtual space, and output a two dimensional projected image viewing the object from a prescribed viewpoint, wherein a line texture drawn as a straight line, segment or curved line having a prescribed width in the two-dimensional projected image is affixed to the object; the storage unit stores starting point position coordinate data and ending point position coordinate data further set in correspondence with the position coordinate of the line object in the virtual space; and the image processing program includes: a step for disposing the line object in the three dimensional space; a step for performing two dimensional perspective transformation to the line object and the starting point position coordinate and ending point position coordinate from the viewpoint position; and a step for drawing a segment connecting the starting point position coordinate and ending point position coordinate subject to the two dimensional perspective transformation superimposed on the two dimensional perspective transformation image of the line object.

DETAILED DESCRIPTION OF THE PREFERRED EMBODIMENTS

Figure 1:
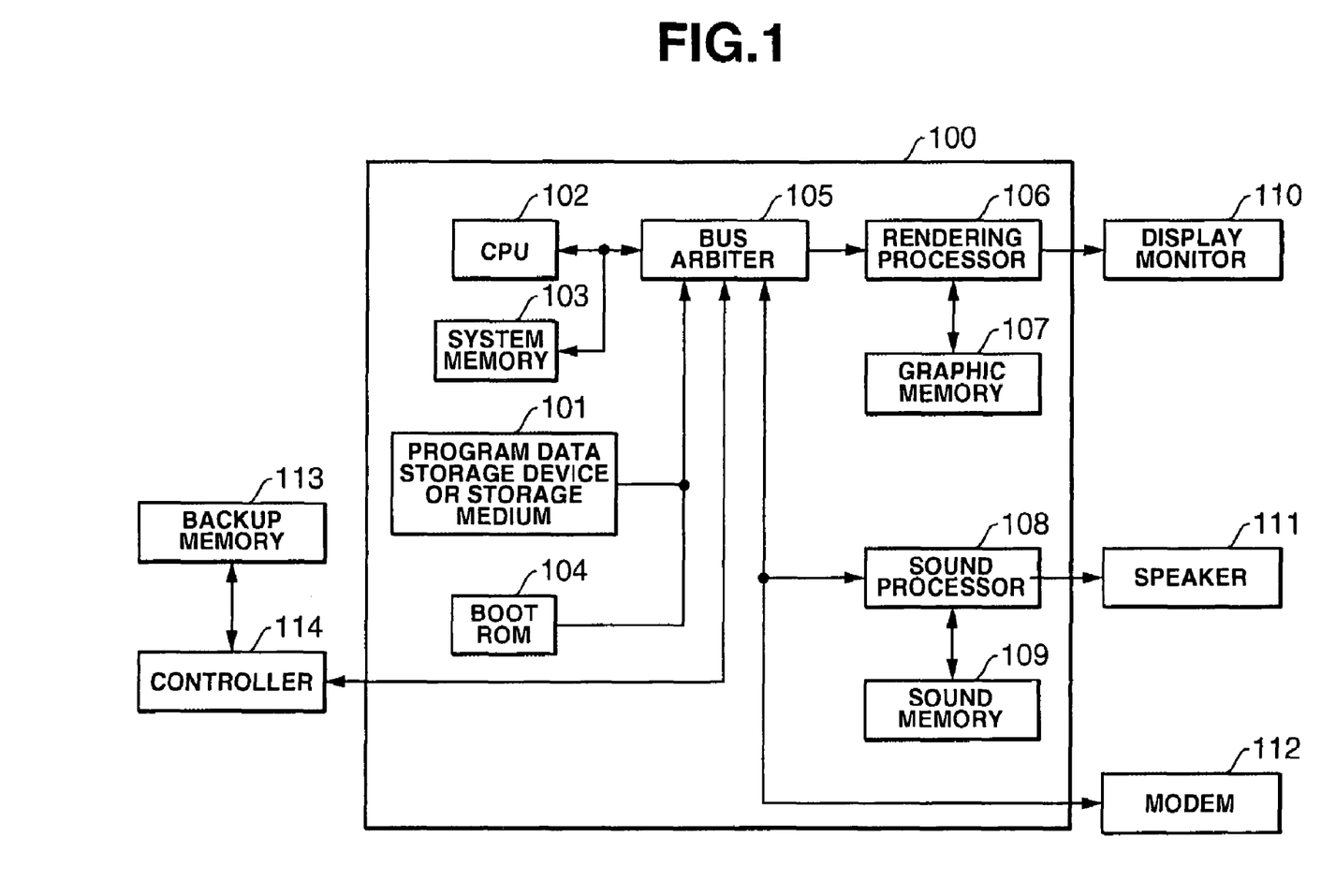
FIG. 1 is a block diagram of the game device employing the present invention.

FIG. 1 is a block diagram of the game device as an example of the image processing device pertaining to the present invention. The game device 100 has a storage device or storage medium (including optical disks and optical disk drives) 101 storing game programs and data (including visual and audio data), a CPU 102 for executing the game program and controlling the overall system as well as performing coordinate calculation for displaying images, a system memory 103 storing programs and data required for the CPU 102 to perform processing, a BOOTROM 104 storing programs and data required for activating the game device 100, and a bus arbiter 105 for controlling the programs and flow of data with the respective blocks of the game device 100 or the equipment to be connected externally, and these are respectively connected via a bus.

A rendering processor 106 is connected to the bus, and the visual (movie) data read out from the program data storage device or storage medium 101 and images to be created according to the player's operation or game progress are displayed on a display monitor 110 with the rendering processor 106. Graphic data and the like required for the rendering processor 106 to create images are stored in the graphic memory (frame buffer) 107.

A sound processor 108 is connected to the bus, and the audio data read out from the program data storage device or storage medium 101 and sound effects and audio to be created according to the player's operation or game progress are output from a speaker 111 with the sound processor 108. Audio data and the like required for the sound processor 106 to generate sounds are stored in the sound memory 109.

The game device 100 is connected to a modem 112, and is capable of communicating with other game devices 100 and network servers via a telephone line (not shown). Further, a backup memory 113 (including a disk storage medium and storage device) for recording information on the progress of the game and program data to be input/output via the modem, and a controller 114 for inputting to the game device 100 information for controlling the game device 100 and equipment connected externally according to the player's operation are also connected to the game device 100. The CPU and rendering processor constitute the image arithmetic processing unit.

As a specific target to which the image processing of the present invention is to be applied, there is a field defined in a three dimensional virtual space such as an application of a soccer game employing the game device illustrated in FIG. 1. The image processing of the present invention is applied to the line constituting this field.

Figure 2:
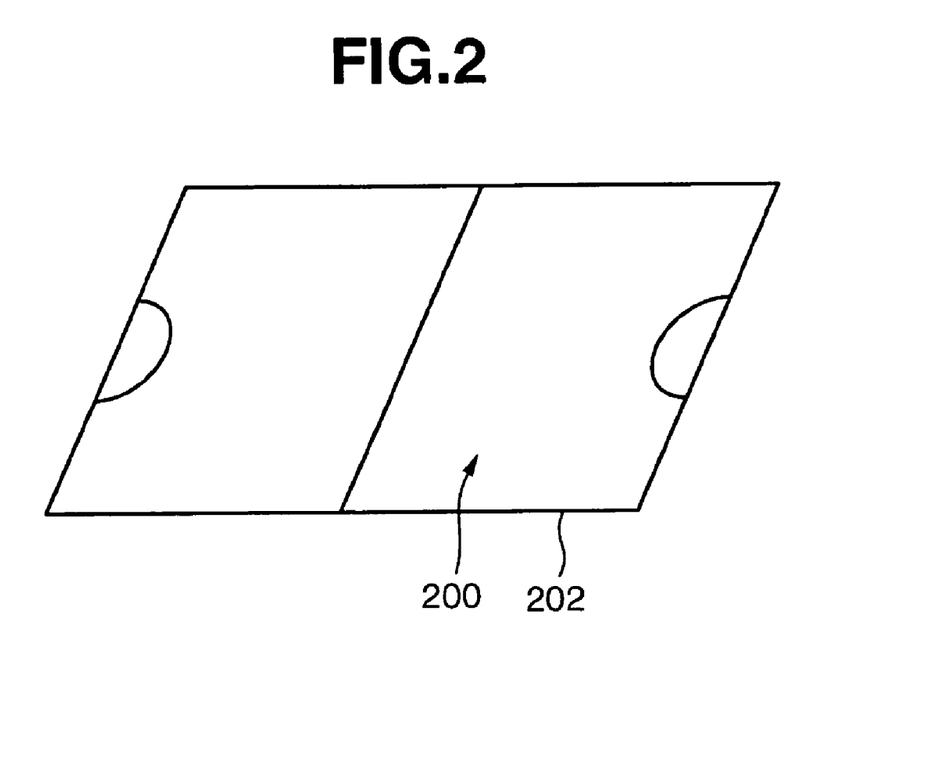
FIG. 2 is view showing a frame format of the model of the line employing the present invention.

FIG. 2 is a plan view showing a state where a line object 202 is placed on a field 200. This line object is configured from a plurality of polygons, and, when the line object is to be displayed on the monitor 110, a white line texture is affixed to the polygons after perspective transformation. A coordinate on the three dimensional virtual space of the polygons constituting the model (line object) of this line is defined in the game program. Further, data for changing the coordinate of the virtual viewpoint is stored in this game program. Perspective transformation is performed to the line object based on the coordinate of the virtual viewpoint, and texture is applied to the position of the line object after perspective transformation.

Figure 3:
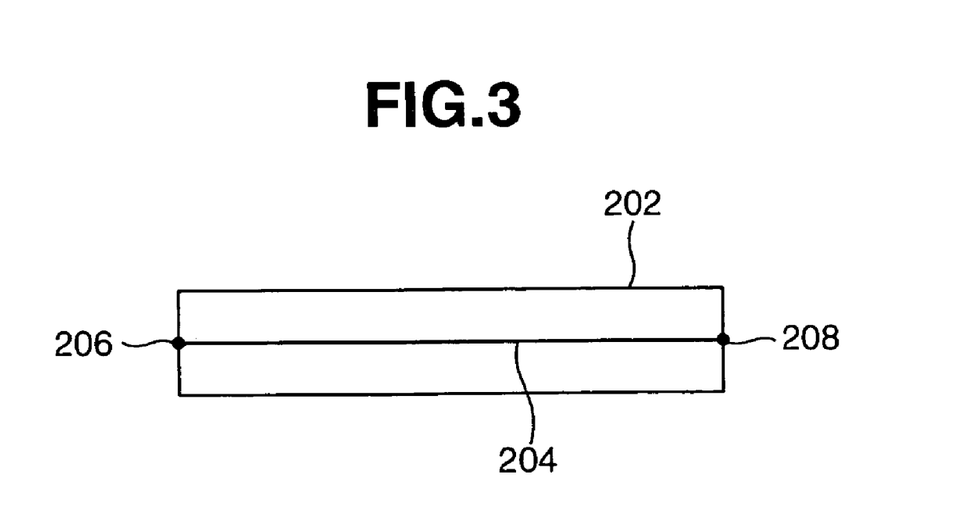
FIG. 3 is a principle diagram showing a state where a separate line having a one dot width is placed on the line object.

FIG. 3 is a plan view showing an image display example of the line object, and shows a state where a separate line 204 having a one dot width is placed on the plurality or singular polygon 202 constituting the line object. This separate line determines two points; namely, the starting point and ending point (e.g., respective intermediate points of the narrow sides of both ends of the line object, apex coordinates of both ends in the width direction, etc.) corresponding to the position coordinate of the polygons of the line object in a global coordinate system, and is defined by connecting these two points with a straight line in a width of one dot. The starting point and ending point are defined in the relative coordinate system for each polygon, and, when the polygons are to be placed in the virtual three dimensional space, the coordinate system on the virtual space of the starting point and ending point is defined.

Figure 4:
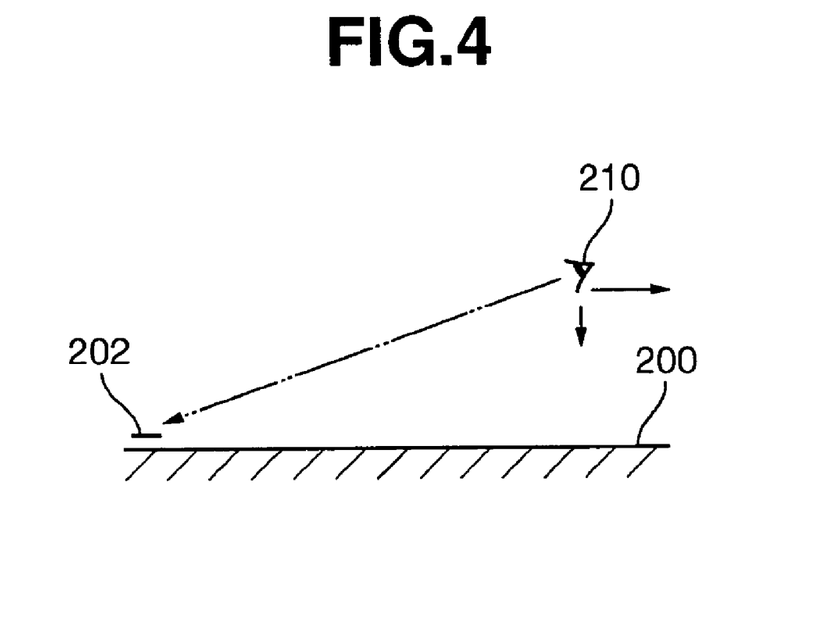
FIG. 4 is a principle diagram showing a case of performing perspective transformation to the line object based on the viewpoint.

As depicted in FIG. 4, the line object 202 is disposed on the field 200 of the three dimensional virtual space (global coordinate system) in close contact with the field or slightly detached in the upward direction (Y axis direction). The polygon line viewed from the virtual viewpoint 210 is subject to perspective transformation (transformed into a two dimensional coordinate), and a line object is drawn in the graphic memory based on the transformed coordinate.

Meanwhile, with respect to the separate line, the CPU or the rendering processor computes the coordinate of the starting point 206 and ending point 208 after perspective transformation in the virtual space coordinate system, and relates the corresponding pixel of the graphic memory to the starting point and ending point. Subsequently, the image processing arithmetic unit determines the plurality of pixels connecting the starting point and ending point in a straight line, and defines all connections of such pixels as the drawn image of the separate line.

In FIG. 4, the more the starting point 210 moves in the direction of the arrow; that is, the more it draws apart from the line object and approaches the field 200, the width of the line object viewed from the viewpoint will become smaller, and, when the viewpoint moves in the direction of the arrow, the width of the line object viewed from the viewpoint will become less than the displayable width of the display device.

Figure 5:
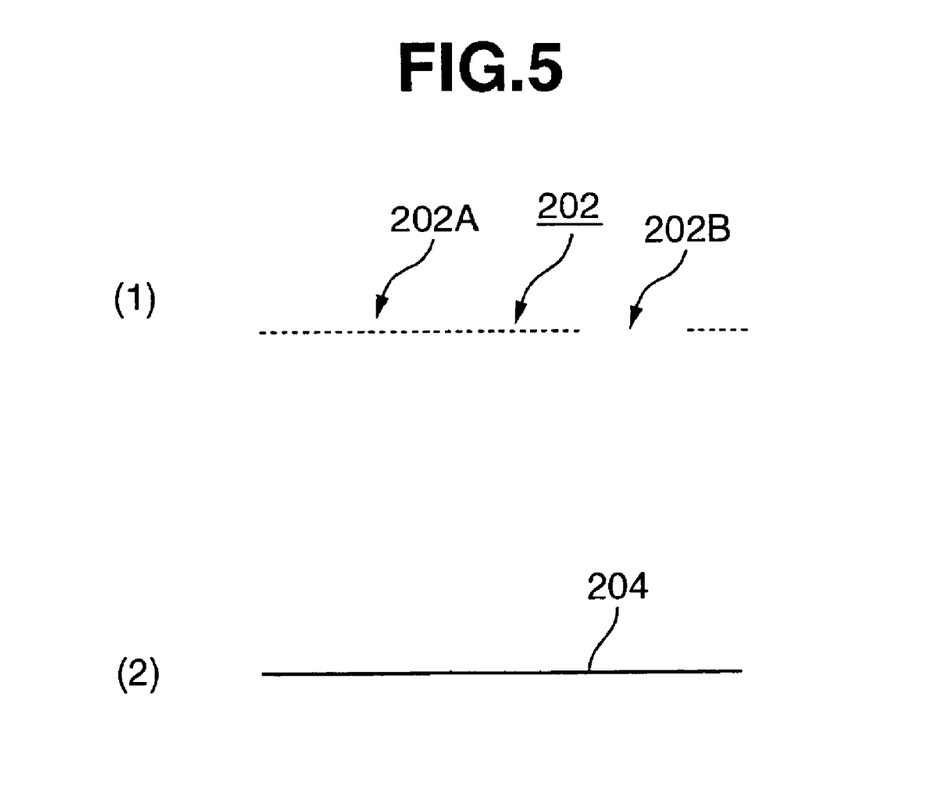
FIG. 5 is a diagram showing a display image (1) of the line object when the width of the perspective transformation image of the line object is less than the displayable scope, and a display image (2) of a separate line having a one dot width.

FIG. 5(1) is a diagram showing a display screen of the line viewed from the viewpoint in a case where the viewpoint 210 depicted in FIG. 4 draws far apart from the line polygon and the viewpoint position is close to the field. When the view of the line polygon 202 becomes less than a pixel level, or due to the arithmetic algorithm processing pertaining to the pixels of the sides of the polygons constituting the line object, phenomena such as the line becoming a dotted shape (202A), or the line being cut off (202B) will occur. FIG. 5(2) is a view showing a frame format of the view of the overall line in the case where the separate line illustrated in FIG. 5 is drawn, and this separate line is not displayed upon being subject to the perspective transformation based on the viewpoint 210, but is compulsorily drawn in the graphic memory at a fixed width. Thus, even when the polygons are viewed as a broken line, the separate line will be displayed clearly on the screen. Since the line itself is to be displayed narrow in this kind of situation, the width of the separate line will suffice so as long as it is at least one pixel (dot).

Figure 6:
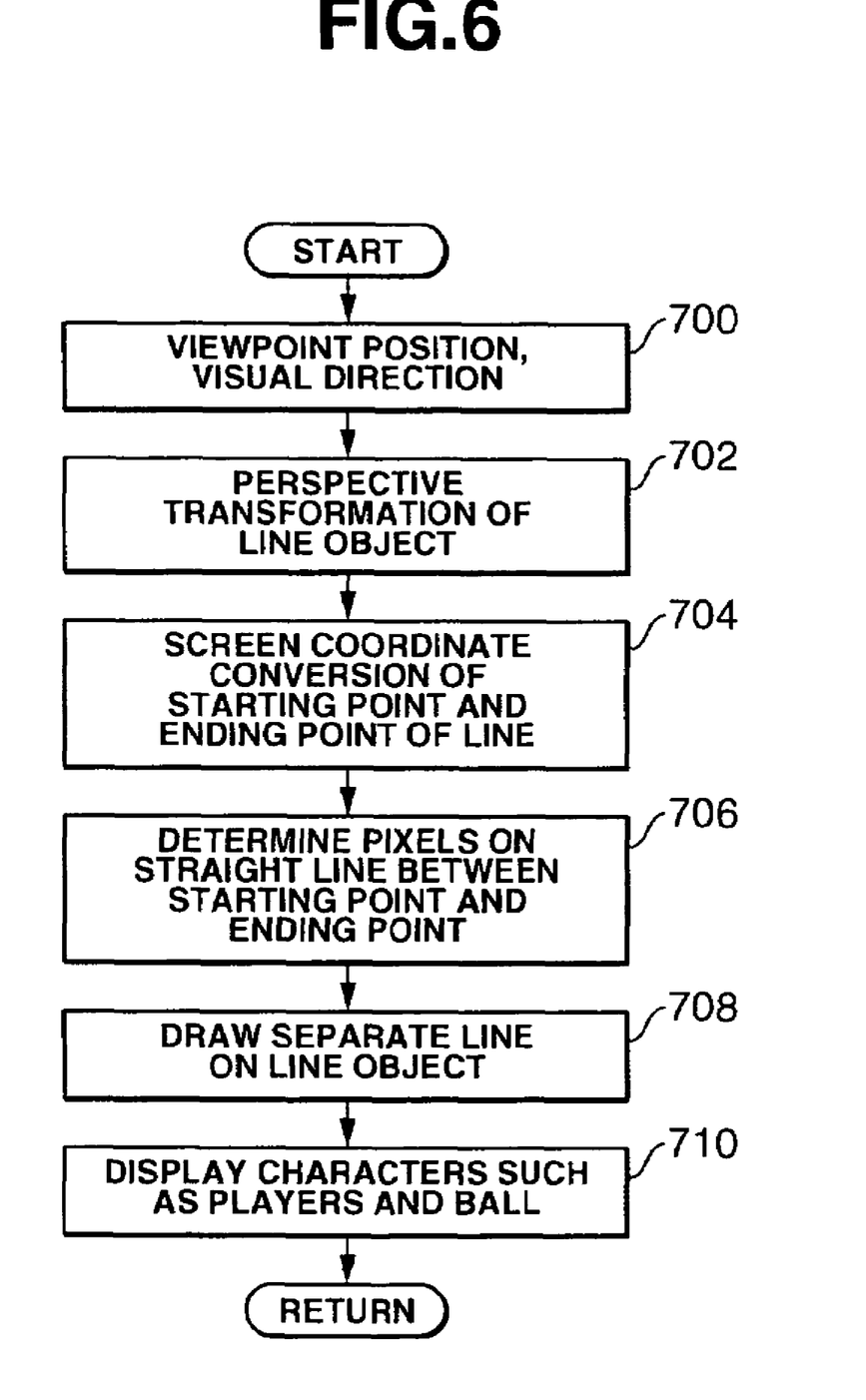
FIG. 6 is a flowchart showing the display operation of the line.

FIG. 6 is a flowchart pertaining to the operation of the image processing of the game device illustrated in FIG. 1 based on the foregoing explanation. At S700, the image processing arithmetic unit determines the viewpoint position and visual direction, and at S702, it performs perspective transformation to the three dimensional virtual space field and line object. At S704, the position of the starting point and ending point of the separate line on the screen coordinate is determined, and at S706, the plurality of pixels on the graphic memory connecting the starting point and ending point is determined. At S708, the line object and separate line are superimposed and drawn. Subsequently, at S710, characters such as players and the ball are drawn on the line.

Figure 7:
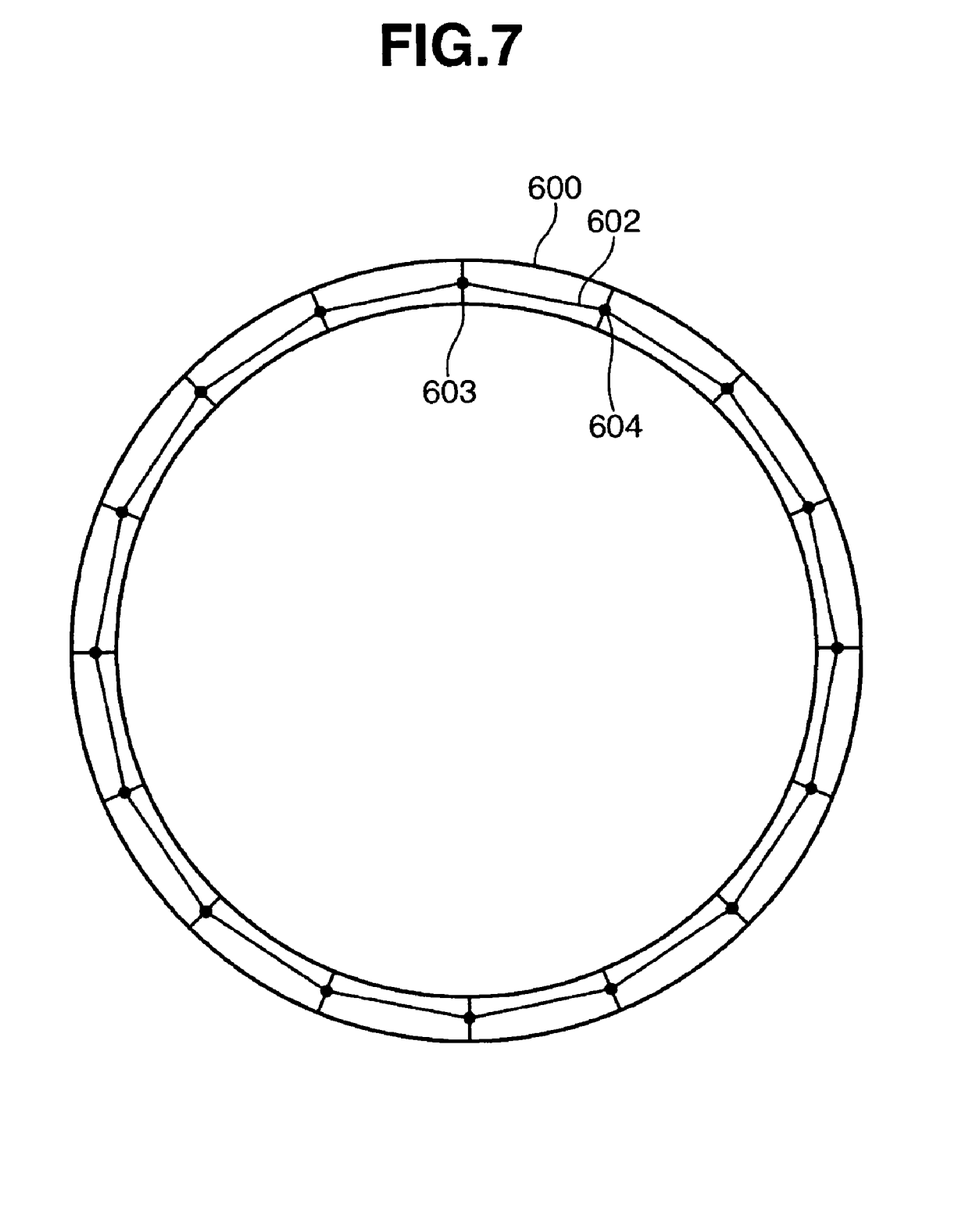
FIG. 7 is a principle diagram for explaining the display operation of a separate line when the model of the line is circular.

Incidentally, in the foregoing explanation, although the explanation described a case where the separate line was a straight line, this may also be a curved line. In FIG. 7, processing is performed such that the line object is constituted in an approximate circle (polygon) formed from a plurality of polygons 600, a plurality of starting points 603 and ending points 604 are set in correspondence with this circular object, and a separate line 602 is drawn so as to connect these starting points and ending points. The plurality of separate lines is connected so as to have an approximate circular external shape along the circular line objects. Incidentally, in FIG. 7, although the starting point and ending point were defined for all polygons, the starting point and ending point may be defined as a single polygon connecting such plurality of polygons.

Further, although a line was explained as the white line to be disposed on the field, a long body such as a string may also be used as the line.

Moreover, in the foregoing embodiments, although the separate line was displayed on the image of the line object regardless of how the line object is viewed after perspective transformation, the separate line may be displayed when the width of the line object after perspective transformation becomes less than a displayable width.

In the foregoing embodiments, although the width of the separate line was made to be one pixel worth in the display coordinate system, there is no limitation thereto, and, when considering that the line object is displayed in a broken line when the line object is reduced and displayed, it is preferably that the width of the separate line is displayed as one pixel worth, or few pixels similar thereto.

What is claimed is:

1. An image processing method with an image processing device comprising an image processing arithmetic unit, comprising:

a step for disposing a linear or curvilinear model formed from polygons in a coordinate system of a three dimensional virtual space based on an image processing program stored in a memory;

a step for setting a viewpoint in said coordinate system;

a step for performing perspective transformation to said model viewed from said viewpoint; and a step for drawing a separate line having a fixed width in a drawing memory based on a coordinate position after the perspective transformation of said model, wherein said separate line is drawn on the coordinate position after the perspective transformation of said model in a fixed width regardless of an occupancy of the width in the coordinate position after the perspective transformation of said model.

2. A computer readable medium storing a program for making a computer execute the respective steps according to claim 1.

3. An image processing device comprising:

a memory storing an image processing program; and an arithmetic unit for executing image processing based on said program, wherein said arithmetic unit comprises:

means for disposing a linear or curvilinear model formed from polygons in a coordinate system of a three dimensional virtual space;

means for setting a viewpoint in said coordinate system;

means for performing perspective transformation to said model viewed from said viewpoint; and means for drawing a separate line having a fixed width in a drawing memory based on a coordinate position after the perspective transformation of said model, wherein said separate line is drawn on the coordinate position after the perspective transformation of said model in a fixed width regardless of an occupancy of the width in the coordinate position after the perspective transformation of said model.

4. A computer readable medium storing an image processing program in an image processing device configured to read object data from storage means, dispose an object in a three dimensional virtual space, and output a two dimensional projected image viewing said object from a prescribed viewpoint, wherein said object is a line object formed from polygons and constituting a straight line, segment or curved line having a prescribed width in said three dimensional virtual space, and said storage means stores starting point position coordinate data and ending point position coordinate data further set in correspondence with the position coordinate of said line object in said virtual space, said image processing program causing said image processing device to execute:

a step for disposing said line object in said three dimensional space;

a step for performing two dimensional perspective transformation to said line object and said starting point position coordinate and ending point position coordinate from said viewpoint position; and a step for drawing a line connecting the starting point position coordinate and ending point position coordinate subject to said two dimensional perspective transformation superimposed on the two dimensional perspective transformation image of said line object, wherein the line connecting the starting point position coordinate and ending point position coordinate subject to said two dimensional perspective transformation is drawn in a fixed width.

5. A computer readable medium storing an image processing program in an image processing device configured to read object data from storage means, dispose an object in a three dimensional virtual space, and output a two dimensional projected image viewing said object from a prescribed viewpoint, wherein a line texture drawn as a straight line, segment or curved line having a prescribed width in said two-dimensional projected image is affixed to said object, said storage means stores starting point position coordinate data and ending point position coordinate data further set in correspondence with the position coordinate of said line object in said virtual space, said image processing program causing said image processing device to execute:

a step for disposing said line object in said three dimensional space;

a step for performing two dimensional perspective transformation to said line object and said starting point position coordinate and ending point position coordinate from said viewpoint position; and a step for drawing a line connecting the starting point position coordinate and ending point position coordinate subject to said two dimensional perspective transformation superimposed on the two dimensional perspective transformation image of said line object, wherein the line connecting the starting point position coordinate and ending point position coordinate subject to said two dimensional perspective transformation is drawn in a fixed width.

6. A computer readable medium storing a program for causing an image processing device to execute:

a step for disposing a linear or curvilinear model formed from polygons in a coordinate system of a three dimensional virtual space;

a step for setting a viewpoint in said coordinate system;

a step for performing perspective transformation to said model viewed from said viewpoint; and a step for drawing a separate line having a fixed width in a drawing memory based on a coordinate position after the perspective transformation of said model, wherein said separate line is drawn on the coordinate position after the perspective transformation of said model in a fixed width regardless of an occupancy of the width in the coordinate position after the perspective transformation of said model.

* * * * *

UNITED STATES PATENT AND TRADEMARK OFFICE
CERTIFICATE OF CORRECTION

PATENT NO. : 7,348,978 B2  Page 1 of 1
APPLICATION NO. : 11/147387
DATED : March 25, 2008
INVENTOR(S) : Takahiro Nagata et al.

It is certified that error appears in the above-identified patent and that said Letters Patent is hereby corrected as shown below:

On the title page, in item (73), after "Kabushiki Kaisha Sega", please insert --doing business as Sega Corporation--.

Signed and Sealed this

Fourteenth Day of October, 2008

JON W. DUDAS
*Director of the United States Patent and Trademark Office*